United States Patent [19]
Ban

[11] Patent Number: 5,937,425
[45] Date of Patent: Aug. 10, 1999

[54] FLASH FILE SYSTEM OPTIMIZED FOR PAGE-MODE FLASH TECHNOLOGIES

[75] Inventor: Amir Ban, Ramat Hasharon, Israel

[73] Assignee: M-Systems Flash Disk Pioneers Ltd., Tel Aviv, Israel

[21] Appl. No.: 08/951,644

[22] Filed: Oct. 16, 1997

[51] Int. Cl.[6] .................................................. G06F 12/08
[52] U.S. Cl. .......................................... 711/103; 711/209
[58] Field of Search .................................. 711/103, 165, 711/209, 202; 365/185.29, 185.33, 185.22, 218

[56] References Cited

U.S. PATENT DOCUMENTS

| | | | |
|---|---|---|---|
| 5,404,485 | 4/1995 | Ban | 711/202 |
| 5,459,850 | 10/1995 | Clay et al. | 711/171 |
| 5,479,638 | 12/1995 | Assar et al. | 711/103 |
| 5,630,093 | 5/1997 | Holzhammer et al. | 711/115 |
| 5,644,539 | 7/1997 | Yamagami et al. | 365/200 |
| 5,682,497 | 10/1997 | Robinson | 711/103 |
| 5,890,188 | 3/1999 | Okamoto et al. | 711/5 |

*Primary Examiner*—Eddie P. Chan
*Assistant Examiner*—Gary J. Portka
*Attorney, Agent, or Firm*—Mark M. Friedman

[57] ABSTRACT

A method for organizing a flash memory in which the size of the memory portion for reading or writing data, such as a block, differs from the size of the smallest portion for erasing, such as a unit. The method of the present invention is particularly useful for page-mode devices exemplified by the NAND and AND technologies, in order to enable these devices to be reorganized when no more unwritten physical units are available.

17 Claims, 6 Drawing Sheets

FLASH FILE SYSTEM OPTIMIZED FOR PAGE-MODE FLASH TECHNOLOGIES

FIELD AND BACKGROUND OF THE INVENTION

The present invention relates to a system of handling data storage on flash devices and, in particular, to a system which manages the storage and retrieval of information on page-mode flash devices, enabling them to behave as flash disks.

Flash devices include electrically erasable and programmable read-only memories (EEPROMs) made of flash-type, floating-gate transistors and are non-volatile memories similar in functionality and performance to EPROM memories, with an additional functionality that allows an in-circuit, programmable, operation to erase pages of the memory. Flash devices have the advantage of being relatively inexpensive and requiring relatively little power as compared to traditional magnetic storage disks. However, in a flash device, it is not practical to rewrite a previously written area of the memory without a preceding page erase of the area. This limitation of flash devices causes them to be incompatible with typical existing operating system programs, since data cannot be written to an area of memory within the flash device in which data has previously been written, unless the area is first erased.

Software products have been proposed in the prior art to allow a flash device to be managed by existing computer operating programs without modification of the operating system program. However, these prior art programs all have deficiencies. For example, one program operates the flash memory as a "write once read many" device. This prior art software product cannot recycle previously written memory locations. When all locations are eventually written the memory cannot be further used without specific user intervention. Other prior art programs, such as those proposed by SanDisk, erase and rewrite an entire memory page every time new data is to be written to the page. This system has the disadvantage of requiring multiple erase cycles, which are both relative slow and inefficient and which lead to a more rapid degredation of the physical media itself.

To overcome these deficiencies of the prior art, a flash File System (FFS) was disclosed in U.S. Pat. No. 5,404,485, herein incorporated by reference. FFS provided a system of data storage and manipulation on flash devices which allowed these devices to emulate magnetic, disk-based data to storage. As noted above, the relatively inexpensive cost and low power consumption of flash devices makes them a favorable choice for data storage, particularly for laptop, portable computers. FFS enhances the ability of flash devices to act as substitutes for magnetic disk storage. Indeed, FFS as disclosed in U.S. Pat. No. 5,404,485 has proven to be so useful that the data layout specification was adopted by the PCMCIA [Personal Computer Memory Card International Association] and JEIDA [Japan Electronic Industry Development Association] committees as a standard called Flash Translation Layer (FTL).

FFS essentially describes a virtual mapping system for flash EEPROM devices. The virtual map is a table which relates the physical address of a read/write block within the flash device to the virtual address of that block. Since each of these blocks is relatively small, 512 bytes, the size of the virtual map itself is quite large. FFS also includes a method of storing and maintaining the bulk of the virtual map on a flash EEPROM device, minimizing the amount of other memory required for storage of the virtual map.

As noted above, FFS has proven particularly successful for transforming flash devices into emulators of magnetic disk storage, so much so that it has been adopted as an industry standard. However, FFS cannot fulfill all of the requirements of the newer flash device technologies. In particular, FFS is not as successful with the NAND and AND flash technologies.

Another example of an attempt to overcome certain deficiencies of prior art flash memory architectures, and in particular those of erase-before-write systems, is disclosed in U.S. Pat. No. 5,479,638. In the system of U.S. Pat. No. 5,479,638, the physical location of a particular read/write block is shifted if further programming to a written block is required. However, this system has the disadvantage of only being operable with those flash devices which can erase a single 512 byte read/write block at a time. Since such a requirement is implemented at the hardware level, this system also cannot be used with the newer NAND and AND flash technologies.

NAND and AND differ from older flash device technologies in a number of respects. First, the erasable unit size is smaller for NAND and AND, around 8 KB, as opposed to 64 KB for older flash devices. Second, the erase time is considerably faster for NAND and AND, even when measured as time required to erase a single byte. Third, the flash memory is divided into pages for NAND and AND which are 256 or 512 bytes in length, which is a fixed characteristic of the hardware devices themselves. It should be noted that the term "page" as used herein is roughly equivalent to the term "block" as used for older flash technologies, although the particular characteristics of a "page" and of a "block" differ somewhat. These features have a number of implications for the operation of flash devices based upon NAND and AND technologies.

First, page-mode memory has a fixed overhead for writing a page or any part of it. By contrast, the overhead for the writing operation in previous flash technologies was proportional to the number of bytes written. Second, the flash memory in NAND and AND is configured so that each page has several spare bytes which are specially addressable. These spare bytes are convenient locations for the storage of information related to the flash memory system. Finally, there is a limitation on the number of times a page may be written before it is erased. This limitation is relatively low, 8 or 10 times, after which further writing without prior erasing is unreliable. Thus, page-mode memory has both significant advantages and new challenges for successful data storage and retrieval.

Unfortunately, as noted above, the currently available prior art data handling system, FFS, has significant disadvantages for the operation of flash memory in page-mode. In particular, FFS demonstrates non-optimized performance on page-mode flash technologies such as NAND and AND because of the restrictions imposed by page-mode programming. Furthermore, the system disclosed in U.S. Pat. No. 5,479,638 also cannot be used with such flash technologies, due to its requirement for a block-by-block erase operation.

There is therefore a need for, and it would be greatly advantageous to have, a system for handling data storage on a NAND or AND flash device which is optimized for performance on page-mode flash technologies, yet which is still usable on older, non-page mode flash devices.

SUMMARY OF THE INVENTION

The present invention provides a memory organization method for a memory in which data can only be written to an unwritten portion of the memory, such that a written portion of the memory must be erased to become unwritten, and in which the size of the memory portion for reading or writing data differs from the size of the smallest memory portion for erasing, the method including the steps of: (a) providing a plurality of physical units of the memory, each of the physical units being the smallest memory portion for erasing, each of the physical units being designated by a physical unit number and each of the physical units being divided into a plurality of physical blocks, each of the plurality of physical blocks being the memory portion for reading or writing data and each of the physical blocks being designated by a physical block offset within the physical unit; (b) providing a plurality of virtual units of the memory, each virtual unit being designated by a virtual unit number and each of the virtual units featuring a plurality of virtual blocks, each of the virtual blocks being designated by a virtual block offset within the virtual unit; (c) providing a virtual map for mapping each virtual unit to at least one physical unit; and (d) mapping each virtual block within the virtual unit to one physical block within the at least one physical unit.

Preferably, the method further includes the steps of: (e) receiving a write command to write data at a virtual block; (t) locating a virtual unit containing the virtual block; (g) locating a writable block within a physical unit mapped to the virtual unit; and (h) writing the data to the writable physical block. More preferably, the method further includes the steps of: (I) if an unwritten physical block in a written physical unit cannot be located, locating an unwritten physical unit; (j) writing the data to a writable physical block of the unwritten physical unit; and (k) updating the virtual map by additionally mapping the virtual unit to the unwritten physical unit, such that the virtual unit corresponds to the unwritten physical unit and to the written physical unit, the unwritten physical unit and the written physical unit forming a chain of physical units. Most preferably, the writable physical block of the unwritten physical unit has a physical block offset, and the physical block offset corresponds to the virtual block offset of the mapped virtual unit. Also most preferably, the method further includes the steps of: (l) if an unwritten physical block in a written physical unit cannot be located, locating a second virtual unit corresponding to a plurality of physical units in a chain; (m) locating the last physical unit in the chain; (n) moving data from each of the physical blocks of the written physical unit to a writable physical block of the last physical unit, the writable physical block having substantially the same block offset as the physical block of the written physical unit; and (o) updating the virtual map by mapping the virtual unit to the last physical unit, such that the virtual unit corresponds substantially only to the last physical unit. Preferably, the method also further includes the step of: (p) erasing substantially all of the written physical units in the chain, with the exception of the last physical unit.

Alternatively and preferably, the method further includes the steps of: (l) if no unwritten physical unit is available for allocation for the chain, allocating an unwritten physical unit for reorganization; (m) moving data from each of the physical blocks of the written physical unit to a writable physical block of the unwritten physical unit; and (n) updating the virtual map by mapping the virtual unit to the unwritten physical unit, such that the virtual unit corresponds substantially only to the unwritten physical unit. More preferably, the method further includes the step of: (o) erasing all of the written physical units.

According to other preferred embodiments of the present invention, the method further includes the steps of: (i) if an unwritten physical block in a written physical unit cannot be located, allocating an unwritten physical unit to form a chain of physical units, such that the unwritten physical unit is a last physical unit in the chain; (j) writing the data to an unwritten physical block in the last physical unit; (k) moving data from each of the physical blocks to a writable physical block of the unwritten physical unit, except data written in step (j); and (m) updating the virtual map by mapping the virtual unit to the written physical unit, such that the virtual unit corresponds to the written physical unit.

According to another embodiment of the present invention, there is provided a method of writing data for a memory in which data can only be written to an unwritten portion of the memory, such that a written portion of the memory must be erased to become unwritten, the method including the steps of: (a) providing a plurality of physical units being divided into a plurality of physical blocks, each of the physical units having a physical unit number and each of the physical blocks having a physical block offset within the physical unit; (b) providing a plurality of virtual units being divided into a plurality of virtual blocks, each of the virtual units having a virtual unit number and each of the virtual blocks having a virtual block offset within the virtual unit, each virtual unit being mapped to at least one physical unit; (c) receiving a write command to write data at a virtual block; (d) determining a virtual unit containing the virtual block having a virtual block offset; (e) locating a physical unit corresponding to the virtual unit; (f) locating a physical block within the physical unit; (g) determining if the physical block is unwritten; (h) writing the data to the physical block only if the physical block is unwritten; (i) alternatively, if the physical block is not unwritten, allocating an unwritten physical unit; (j) locating a writable physical block within the unwritten physical unit, the writable physical block having a physical block offset; (k) writing the data to the writable physical block; and (l) additionally mapping the virtual unit to the unwritten physical unit containing the writable physical block, such that the virtual unit is additionally mapped to the unwritten physical unit to form a chain of physical units. Preferably, the physical block offset of the writable physical block has an identical block offset number as the virtual block offset.

Preferably, the method further includes the steps of: (m) if an unwritten physical block in a written physical unit cannot be located, locating a second virtual unit corresponding to a plurality of physical units in a chain; (n) locating the last physical unit in the chain; (o) transferring all data within the physical blocks of the written physical unit to the physical blocks of the last physical unit; and (p) updating the virtual map such that the virtual unit corresponds only to the last physical unit. Most preferably, the method further includes the step of: (q) erasing all of the written physical units.

Alternatively and preferably, the method further includes the steps of: (l) if no unwritten physical unit is available for allocation, locating a last physical unit in the chain; (m) transferring all data within the physical blocks of the written physical units to the physical blocks of the last physical unit; and (n) updating the virtual map such that the virtual unit corresponds only to the last physical unit. More preferably, the method further includes the step of: (o) erasing substantially all of the written physical units, with the exception of the last physical unit.

DESCRIPTION OF THE INVENTION

The present invention is of a method of organizing a flash memory in which the size of the memory portion for reading or writing data, such as a block, differs from the size of the smallest portion for erasing, such as a unit. Examples of types of flash memory which can be organized according to the method of the present invention include, but are not limited to, page-mode devices exemplified by the NAND and AND technologies. Methods are also provided of reading and writing data to the flash memory, and of reorganizing the flash memory when no more unwritten physical units are available.

Hereinafter, the term "physical unit" is defined as a unit on the physical media or hardware of the memory which is the smallest portion of the memory which can be erased, or an integral multiple thereof. It is a portion of the memory which is contiguous, fixed in size and erasable. The term "physical block" is defined as being the portion of the memory for reading or writing data. Hereinafter, the term "virtual unit" is defined as the same size as the physical unit. For page-mode memory technologies such as NAND and AND, the smallest portion of the memory which can be erased is larger than the page size, typically about 8 KB. As used herein, the term "physical block" is equivalent to the term "page" for page-mode memory technologies. Thus, virtual units are as large as physical units.

Hereinafter, the term "virtual map" refers to a table which relates a virtual unit to at least one corresponding physical unit. As noted previously, each unit, virtual or physical, is composed of a plurality of blocks. The exact location of a block within a unit is determined according to one or more preset rules, as further described below.

Each physical unit is designated by a physical unit number. The location of each physical block is given by a physical block offset. Similarly, each virtual unit is designated by a virtual unit number. The location of each virtual block is given by a virtual block offset. It should be noted that each virtual unit number can correspond to one or more physical unit numbers. Thus, the mapping between virtual units and physical units can either be one-to-one or one-to-many.

Hereinafter, the term "writing data" describes the act of storing data on the flash memory. The term "reading data" describes the act of retrieving data from the flash memory. Hereinafter, the term "unwritten" indicates some portion of the memory, such as a physical block, which is capable of having data written to it. Thus, the term "unwritten" includes, but is not limited to, a portion of the memory which has just been erased.

In a computer or other electronic device having a flash memory organized according to the present invention, the operating system of that device interacts with the virtual units and virtual blocks for reading and writing data. The virtual media, which includes the virtual units and blocks, thus acts as an interface for the operating system to interact with the flash memory device. For example, the operating system issues a write command to write data to a virtual block at a virtual block offset. The virtual unit containing the virtual block is then located. The virtual map then locates a corresponding physical block within a physical unit of the memory, where the data are actually stored. Although the operating system issues read and write commands as though the virtual units and virtual blocks are the actual hardware of the flash memory, in reality the actual hardware is incorporated in the physical units and physical blocks of the flash memory. Thus, the operating system is only aware of the virtual units and blocks, and does not directly interact with the hardware itself.

The advantage of such an interface is that the inherent disadvantages of the flash memory, such as the requirement for an erase before further writing can occur, are overcome by the interactions of the operating system with the virtual memory. Additionally, the operating system of the electronic device does not have to organize the addresses of the flash memory. Furthermore, the operating system can interact with a variety of different flash memory technologies without requiring extensive modifications, since one interface can be used with multiple types of flash memory devices. Thus, the methods of the present invention permit the greatest flexibility for flash memory devices and the electronic devices which use them.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides a system for organizing a page-mode flash memory device, such as a NAND or AND flash device. This system includes methods for reading from, and writing to, such flash devices. Furthermore, the system also provides an interface which enables the flash device to successfully emulate magnetic disk storage. Such flash memory devices can be installed in a variety of host devices, such as a personal or laptop computer.

While this invention will be described in the context of a flash memory, those skilled in the art will understand that its teachings are also applicable to data storage devices with the same write, read, and unit erase characteristics as flash memories.

The principles and operation of a system for organizing a page-mode flash memory device according to the present invention may be better understood with reference to the drawings and the accompanying description.

Figure 1:
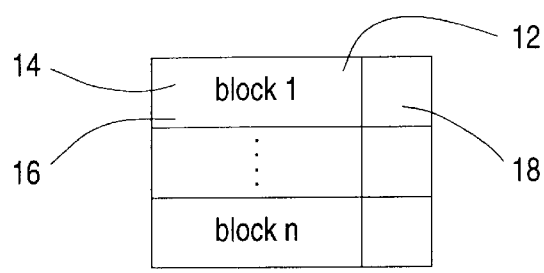
FIG. 1 is a schematic diagram of a physical flash memory device according to the present invention.

Referring now to the drawings, FIG. 1 schematically illustrates a prior art physical page-mode flash memory device according to a technology such as NAND, for example. The term "physical device" is hereinafter defined as the actual hardware itself which contains the physical media for the flash memory device. Such physical media is typically composed of flash EEPROM units, although any suitable non-volatile, programmable memory device could be substituted. The term "programmable" is hereinafter defined as alterable, such as by having data written to the memory device, for example.

A flash memory physical device 10 is shown, with at least one physical unit 12. Physical unit 12 is the smallest segment of physical device 10 which can be erased. Physical unit 12 includes an integral number of blocks, individually designated as blocks 1 to n, where n is an integer, and collectively designated as block 14. Block 14 is composed of a contiguous, fixed-length group of physical byte addresses and is a feature of the hardware. Specifically, the size of block 14 is a characteristic of physical device 10. User data can be stored in a primary data area 16 of block 14. Each block 14 also has a control data area 18. Control data area 18 is addressable by a separate algorithm from the main portion of block 14 and is not included in calculations of the size of block 14. As further described below, control data area 18 is convenient for the storage of information related to the flash filing system itself. Each physical unit 12 is either an assigned unit or an unassigned unit. Each unassigned unit is free, contains no useful data and is ready to be allocated and assigned. Each assigned unit has been allocated and contains data.

Figure 2:
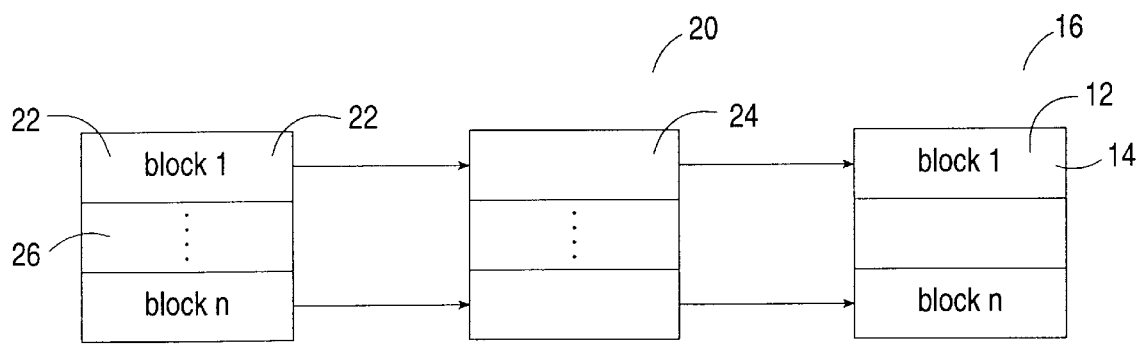
FIG. 2 is a diagram of a basic system of organizing the flash memory device according to the present invention.

FIG. 2 illustrates a system for organizing a basic flash memory device. A system 20 controls both a virtual media 22 and physical device 10, and relates virtual media 22 to physical device 10 through a virtual map 24. Virtual media 22 includes a plurality of virtual units 26. Each virtual unit 26 has a plurality of virtual blocks 28. Each virtual unit 26 is designated by a virtual address. The virtual address includes a virtual unit number, designating a particular virtual unit 26. Each virtual block 28 is designated by a virtual block offset. Similarly, each physical unit 12 has a physical address. The physical address includes a physical unit number, designating a particular physical unit 12. Each physical block 14 has a physical block offset.

Virtual map 24 maps virtual unit 26, which is an assigned virtual unit, to at least one physical unit 12, which is an assigned physical unit. As for the physical units, if a virtual unit has been mapped to at least one physical unit, it is an assigned virtual unit. However, one virtual unit 26 can be mapped to more than one physical unit 12. Thus, the correspondence between virtual unit 26 and physical unit 12 can be either one-to-one or one-to-many.

System 20 operates as follows. The operating system of an electronic device which contains a flash memory device (not shown) sends a command, such as a read command or a write command, to a particular virtual block 28 within a particular virtual unit 26. Virtual map 24 then locates the corresponding physical block 14 within a physical unit 12.

If the correspondence of the mapping is one-to-one as shown, with each virtual unit 26 being mapped to exactly one physical unit 12, then the situation would appear to be relatively simple. However, as noted above, physical device 10 has particular physical constraints for reading and writing data, including the requirement for performing periodic erasures before additional data can be written. There are two possible solutions to these constraints which do not involve frequent, repeated erasures of physical device 10 or a portion thereof.

Figure 3A:
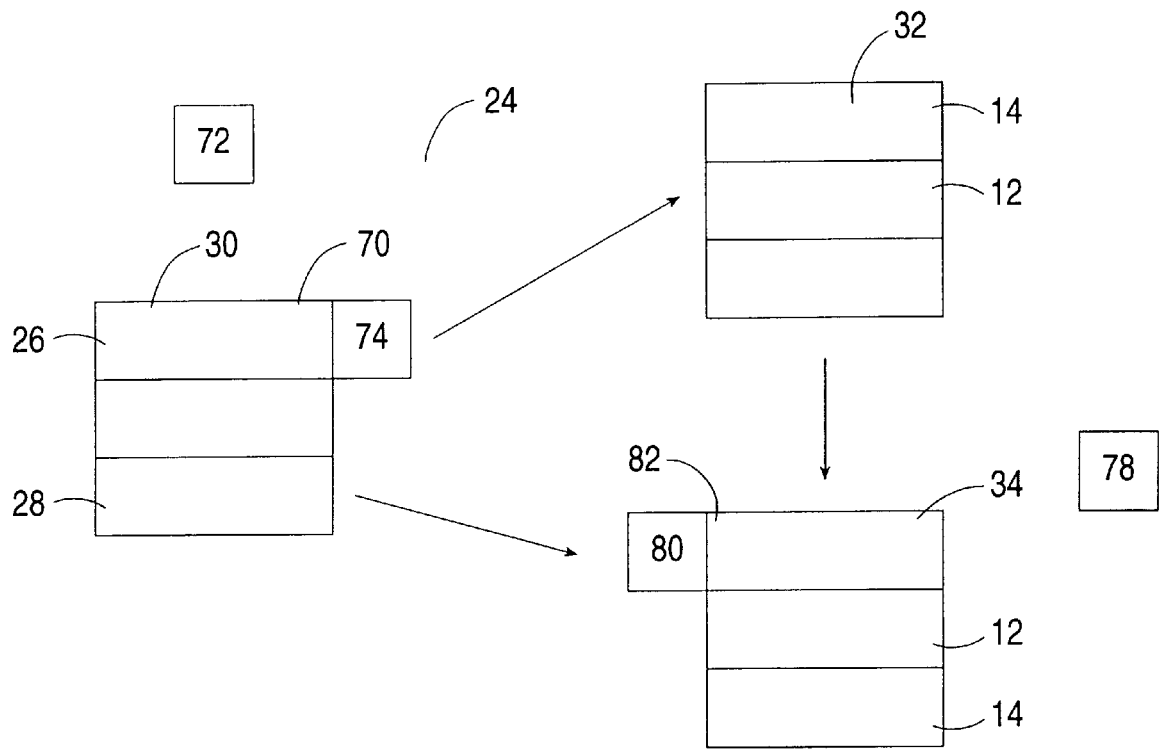
FIGS. 3A and 3B show ANAND and FMAX systems, respectively, according to the present invention.
Figure 3A:
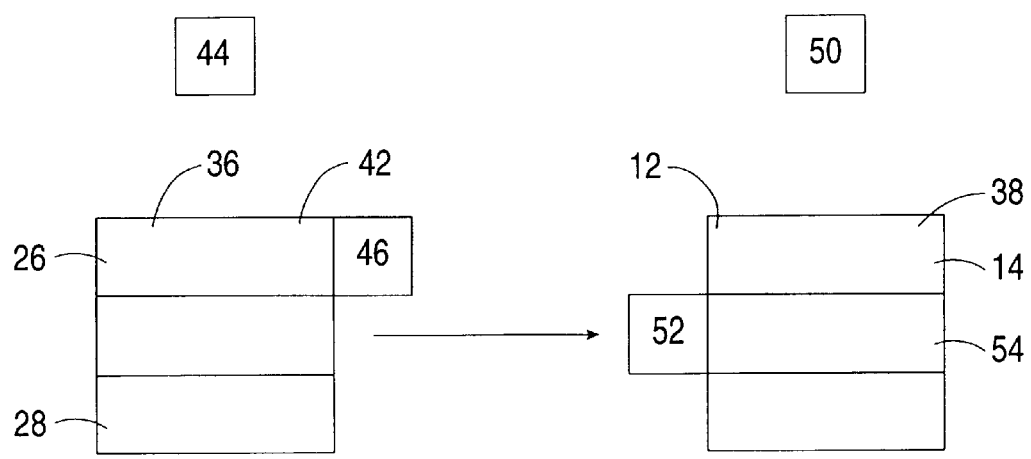

The first solution is shown in FIG. 3A, in which the correspondence between virtual unit 26 and physical unit 12 is one-to-many, so that each virtual unit 26 corresponds to a plurality of physical units 12. Virtual map 24 must hold the information required to perform such a mapping. An example of a portion of virtual map 24 is given in FIG. 3A, and is usable with the ANAND system of the present invention.

The portion of virtual map 24 shows physical blocks 14 within physical units 12, and virtual blocks 28 within virtual units 26. In this example, one particular virtual unit 30 corresponds to two physical units 12. The first physical unit 12 is a primary unit 32. The second physical unit 12 is a replacement unit 34. For each virtual unit 26 there can only be one primary unit 32. However, there can be zero or more replacement units 34 associated with each virtual unit 26. As an example, a virtual unit 36 corresponds only to a primary unit 38 and no replacement units 34, so virtual unit 36 is an example of a non-replaced virtual unit.

The organization of virtual blocks 28 will depend upon the number of physical block(s) 14 corresponding to a particular virtual unit 26. For virtual unit 30, some virtual blocks 28 correspond to physical blocks 14 within primary unit 32, while other virtual blocks 28 correspond to physical blocks 14 within replacement unit 34. For virtual unit 36, substantially all virtual blocks 28 correspond to physical blocks 14 within primary unit 38.

In the simplest case, in which the virtual unit is a non-replaced unit, the procedure for locating a particular physical block 14 is as follows. A virtual unit 36 has a virtual unit number 44 which designates virtual unit 36, and a virtual block offset 46 which designates virtual block 42. Note that virtual block offset 46 is also a number. Physical unit number 50 designates primary unit 38. A physical block offset 52 designates a physical block 54 within primary unit 38. To locate physical block 54 for the purposes of reading or writing data, the first rule is to divide the desired virtual block offset 46 by the number of blocks per virtual unit to determine virtual unit number 44. Virtual map 24 then maps virtual unit number 44 to a physical unit number 50. The second rule is that the desired physical block 14, in this case physical block 54, can be located within physical unit 38 according to physical block offset 52 which must be the same number as virtual block offset 46. Thus, virtual map 24 only contains information about virtual and physical units, but rules are used to determine the proper block offsets.

In the more complex case, each virtual unit corresponds to more than one physical unit. In this case, the group of two or more physical units is called a "chain". For example, a virtual unit number 72 designates virtual unit 30, and a virtual block offset 74 designates virtual block 70. A physical unit number 78 designates replacement unit 34 and a physical block offset 80 designates a physical block 82 within replacement unit 34. Thus, virtual block 70 of virtual unit 30 corresponds to physical block 82 of replacement unit 34.

To locate physical block 82 for the purposes of reading or writing data, again the first rule is to divide the desired virtual block offset 74 by the number of blocks per virtual unit to determine virtual unit number 72. Virtual map 24 then maps virtual unit number 72 to physical unit number 78. However, there is a problem. As stated previously, the second rule is that the desired physical block is located within the physical unit according to the physical block offset, which must be the same number as the virtual block offset. In this case, there are a plurality of physical blocks 14 in the chain. In order to determine which physical block 14 has the data, the third rule is that each physical block 14 having the same block offset as virtual block 70 is examined in each physical unit of the chain. The last non-free physical block 14, in this case physical block 82 of replacement unit 34, contains the desired data for reading. Conversely, for writing data, the first free physical block 14 is the desired block.

Since physical blocks are written in the order of the physical unit in the chain to which they belong, the term "last non-free physical block" refers to the physical block in a unit which is farthest down the chain but which is still non-free. Either there are no more units in the chain, or the physical block having the same block offset in the next unit in the chain is free. Similarly, to find the first free physical block, each physical block having a desired block offset is examined in each physical unit in the chain, starting with the primary unit and continuing down through each replacement unit in turn, until a free block is found.

Figure 3B:
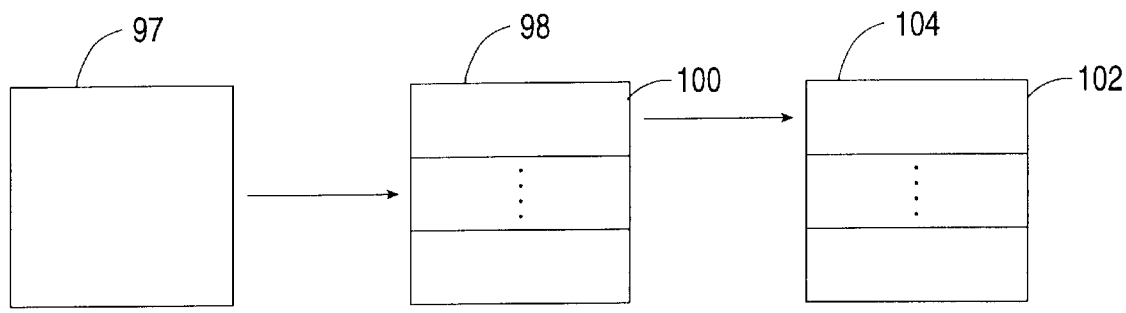
Figure 3B:
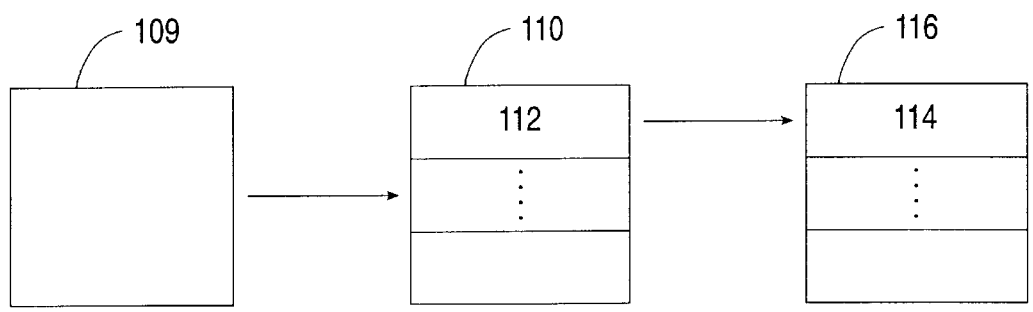

By contrast, FMAX, although it uses a similar virtual map and addressing system, has only one replacement unit for each primary unit, as shown in FIG. 3B. To accomplish this, FMAX uses simple and compound replacement (physical) units. A simple replacement unit is a unit in which substantially all of the physical block offsets of the physical unit correlate directly to the virtual block offsets of the corresponding virtual unit. A compound replacement unit is a unit in which such a direct correspondence between virtual block offsets and physical block offsets does not necessarily exist. Instead, if the physical block having the corresponding physical block offset is not available for writing, a different physical block is chosen. Control information is then written to the control data area in order to determine the actual correspondence between a virtual block and a physical block.

As shown in FIG. 3B, primary unit 97 has a simple replacement unit 98, which has a plurality of physical blocks 100, each of which corresponds to a virtual block 102 in a virtual unit 104. Each physical block offset corresponds to a virtual block offset which is the identical offset number.

However, if the physical block having the needed physical block offset is not available, then a different physical block in the same physical unit must be written and the replacement unit becomes a compound replacement unit. A second primary unit 109 has a compound physical unit 110, which also has a plurality of physical blocks 112, each of which corresponds to a virtual block 114 in a virtual unit 116. However, one physical block offset could correspond to a virtual block offset which is the identical offset number, while a second physical block offset might correspond to a second virtual block offset which is not the identical offset number. To find a particular physical block, the control information written to the control data area must be examined. As further described below, this has significant consequences for both writing data and reorganizing the FMAX system when necessary.

Figure 4A:
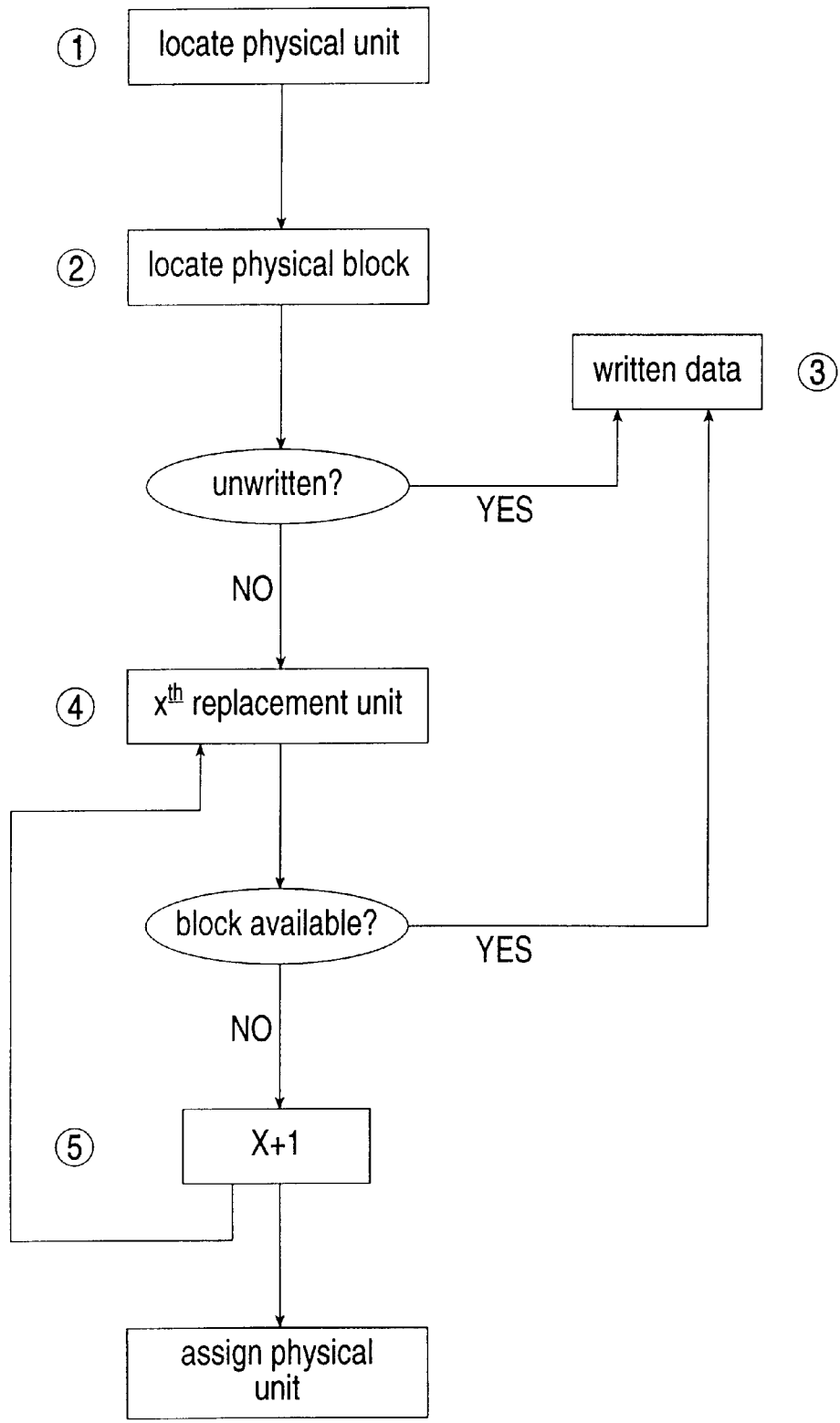
FIGS. 4A and 4B show writing algorithms for the ANAND and FMAX systems, respectively, according to the present invention.
Figure 4B:
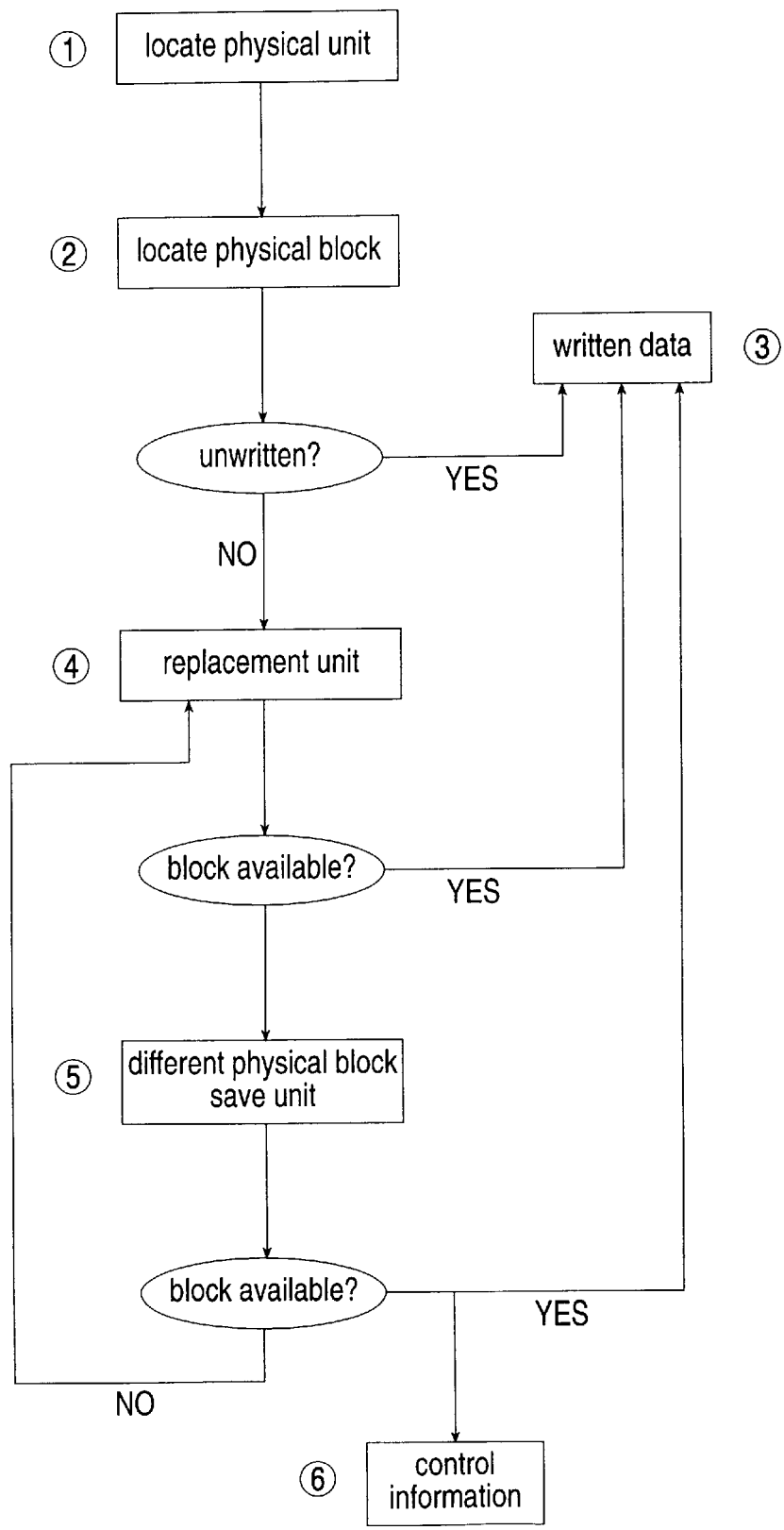

FIG. 4A shows a flow-chart for manipulating the virtual map of FIG. 3A, while FIG. 4B shows a flow-chart for manipulating the virtual map of FIG. 3B. In the simplest case, where all replacement units are either simple units, or primary units with only one replacement unit, the same steps can be used for both ANAND and FMAX. First, the virtual unit number and the virtual block offset is calculated by dividing the number of the virtual block to be located into the number of blocks per virtual unit, giving the virtual unit number. The modulo, or division remainder, is the virtual block offset.

Next, the virtual map is examined to find the physical unit which corresponds to the virtual unit. If no physical unit can be found which corresponds to the virtual unit, then the required portion of physical memory does not exist on the flash device. As noted above, this simple scheme is only operative if all replacement units are simple units, or the primary units have only one replacement unit. However, this scheme does not work if the physical block to which data is to be written has already been programmed, or written, with other data. In this case, a replacement scheme is required which can handle the task of finding another physical block to which the data can be written.

Two different algorithms are illustrated in FIG. 4A (ANAND) and FIG. 4B (FMAX). Both algorithms start in the same manner. In step 1, the desired physical unit is located. In step 2, the physical block corresponding to the specified block offset is located within that physical unit. In step 3, if the block is unwritten, the data is written to the block. If the desired physical block is not available, then the two systems of the present invention, ANAND and FMAX, diverge in the way that each technology handles the situation where the desired physical block has already been written.

As shown in FIG. 4A, the ANAND system will handle this situation by looking at the replacement unit(s). In step 4, the $x^{th}$ replacement physical unit is examined, where x is an integer initially equal to 1. If that physical unit has an unwritten physical block with the desired physical block offset, the data is written to the physical block. If the block is not available, then as shown in step 5, x is incremented by one, and step 4 is repeated. Steps 4 and 5 are repeated until the data are either written to a block or no other replacement units in the chain are found. In step 6, an unassigned physical unit is assigned as a replacement unit, and the data are written to the block with the desired block offset.

The FMAX system handles this situation differently, as shown in FIG. 4B. In step 4, a physical block with the same physical block offset in a replacement unit is located. If that physical block is unwritten, the data are written to that physical block. Otherwise, a physical block with a different physical block offset in the replacement unit is located, as in step 5. Step 5 is repeated until an unwritten physical block is located. The replacement unit is now a compound unit, since the virtual block offsets are no longer the same as the physical block offsets. In step 6, control information is appended to the control data area of the physical unit to enable the mapping scheme to find the correct location of any physical block within the compound unit.

However, even these replacement algorithms may not be sufficient to handle all of the different needs of flash devices. Both the ANAND and FMAX systems will eventually reach a situation where further data cannot be written to a block within a physical unit because such a physical block is not available.

Figure 5A:
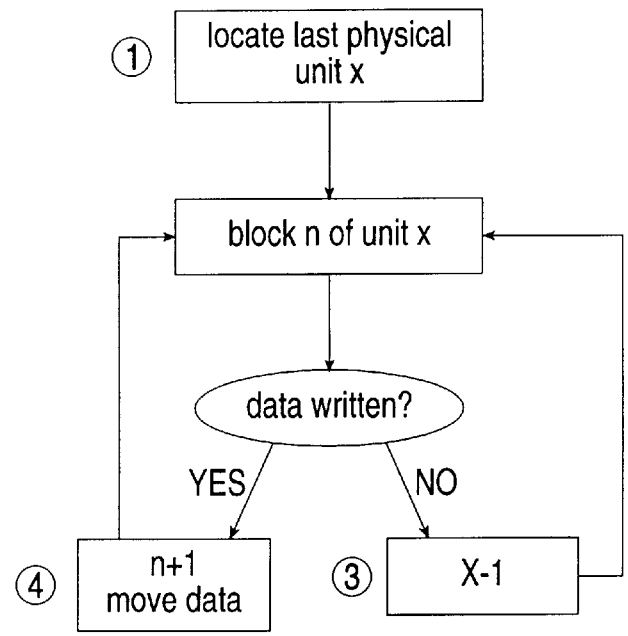
FIGS. 5A and 5B show reorganization algorithms for the ANAND and FMAX systems, respectively, according to the present invention.

In this situation, a virtual unit must be reorganized to restructure the data into its simplest state, which is a non-replaced primary unit. During this reorganization process, physical replacement units which previously belonged to the virtual unit representation are freed, thereby becoming unassigned or free physical units. For both ANAND replacement units, and simple FMAX replacement units, this reorganization process is called folding and is diagrammed in FIG. 5A below.

Folding requires physical blocks to be written at the same physical block offset in the replacement unit as they would have been written in the primary unit, for reasons which will become more clear as the process is described. In the first step of folding, the last physical unit in the chain is identified, physical unit x, where x is an integer ranging from 1 to some predetermined implementation-dependent limit. Note that where x equals 1, the replacement unit is actually the primary unit and the rest of the algorithm is not performed. Also note that for FMAX, x equals 1 or 2.

In step 2, block n of unit x is examined, where n is an integer. If data are written to block n, n is incremented by 1. If not, then in step 3 x is decremented by 1. Steps 2 and 3 are repeated until either x is equal to 0 or a written block n is found. If a written block n is found, then the data are moved to block n of the last replacement unit in the chain, in step 4. Steps 2–4 are repeated until all data has been transferred to the last replacement unit, which then becomes the primary unit. All other units in the chain, if any, including the previous primary unit, are then freed and are available for allocation. The virtual map is also updated to reflect the fact that the virtual unit now corresponds to one physical unit.

Figure 5B:
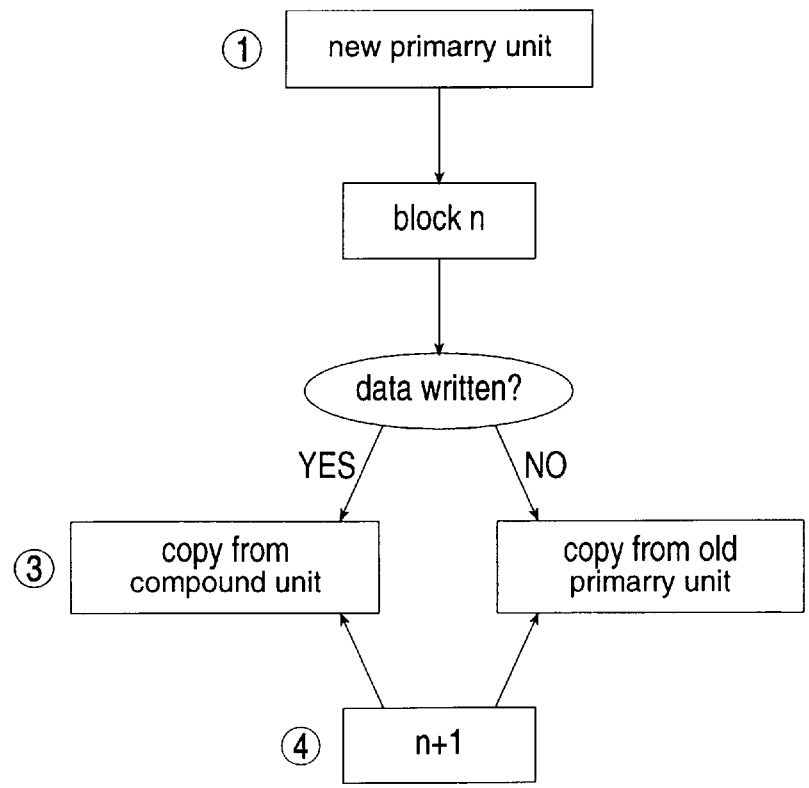

Unfortunately, folding does not work for compound FMAX replacement units, since blocks within the replacement unit do not always have a physical block offset which is equal to the virtual block offset. A different process of reallocation is shown for such compound physical units in FIG. 5B. In step 1, a new, unallocated physical unit is designated as the new primary physical unit. In step 2, block n of the compound physical unit is examined. If data are written to block n of the compound physical unit, the data are copied to the new primary unit in step 3. If not, data from block n of the old primary unit are written to the new primary unit. In step 4, n is incremented by 1. Steps 2–4 are repeated until all blocks have been copied. Once all of the blocks have been copied, the previous replacement unit, as well as the old primary unit, are freed and are then available for allocation. As in the previous procedure, the virtual map is updated to reflect the fact that the virtual unit now corresponds to only one physical unit.

A highly simplified embodiment of the reorganization scheme is also possible. In this simplified embodiment, the process of reorganization occurs immediately after a replacement unit is allocated. The replacement unit is therefore only a transient feature of the system, and in the quiescent state, in which the physical memory is not undergoing the process of writing, data exists exclusively in primary non-replaced units. The replacement unit exists only for the process of writing. At the end of the process, all of the information is transferred to a new unit, so that the replacement unit effectively disappears. This method has the advantage of simplicity of implementation and of control structures which are required to manage it. However, its disadvantage is that it is not efficient, reducing the write performance of the system.

All of the methods included in the present invention must be able to record control information on the physical flash device itself, in order to describe the state of the stored data. In particular, unit and block control information are preferably stored, although alternatively such data can be reconstructed from other types of data. Unit control information describes the physical unit number assigned to the physical unit, the status of the physical unit itself as a primary or replacement unit, and its position relative to other units. Block control information describes whether the physical block is occupied, freed or superseded by information residing in a different physical block.

One or both of these different types of information may be recorded in a special portion of the physical device. As noted above in FIG. 1, preferably ANAND and FMAX systems divide each physical unit 12 into primary data areas 16, containing the actual user data recorded on the physical flash device, and control data areas 18, containing the control information. Although such areas are shown as subdivisions of block 16, physical unit 12 could also be divided into primary data areas and control data areas which are substantially independent of divisions into blocks. It should be noted that control data areas 18 are not included within the block location scheme of primary data areas 16 and are also not included when calculating the overall size of the physical flash disk.

Since NAND and AND flash technologies have spare areas for each block of the memory, the control information is usually recorded in the spare area of the block, and the user data are located in the primary block area.

For those flash technologies in which no spare area is provided, every physical unit can be divided into a main area for storing user data, and an overhead section, for storing the required control information.

It will be appreciated that the above descriptions are intended only to serve as examples, and that many other embodiments are possible within the spirit and the scope of the present invention.

What is claimed is:

1. A memory organization method for a memory in which data can only be written to an unwritten portion of the memory, such that a written portion of the memory must be erased to become unwritten, and in which the size of the memory portion for reading or writing data differs from the size of the smallest memory portion for erasing, the method comprising the steps of:

(a) providing a plurality of physical units of the memory, each of said physical units being the size of the smallest memory portion for erasing, each of said physical units being designated by a physical unit number and each of said physical units being divided into a plurality of physical blocks, each of said plurality of physical blocks being the size of the memory portion for reading or writing data and each of said physical blocks being designated by a physical block offset within said physical unit;

(b) providing a plurality of virtual units of the memory, each virtual unit being designated by a virtual unit number and each of said virtual units featuring a plurality of virtual blocks, each of said virtual blocks being designated by a virtual block offset within said virtual unit;

(c) mapping each virtual unit to at least one physical unit to form a virtual map; and (d) mapping each virtual block within said virtual unit to one physical block within said at least one physical unit according to said virtual map.

2. The method of claim 1, further comprising the steps of:

(e) receiving a write command to write data at a virtual block;

(f) locating a virtual unit containing said virtual block;

(g) locating a writable block within a physical unit mapped to said virtual unit; and (h) writing said data to said writable physical block to form a written physical unit.

3. The method of claim 2, further comprising the steps of:

(i) if an unwritten physical block in said written physical unit cannot be located, locating a second physical unit;

(j) writing said data to a writable physical block of said second physical unit; and (k) updating said virtual map by additionally mapping said virtual unit to said second physical unit, such that said virtual unit corresponds to said second physical unit and to said written physical unit, said second physical unit and said written physical unit forming a chain of physical units.

4. The method of claim 3, wherein said writable physical block of said second physical unit has a physical block offset, and said physical block offset corresponds to said virtual block offset of said mapped virtual unit.

5. The method of claim 3, further comprising the steps of:

(l) if an unwritten physical block cannot be located in any physical unit, locating a second virtual unit corresponding to a plurality of physical units in a chain;

(m) locating said last physical unit in said chain;

(n) moving data from each of said physical blocks of said written physical unit to a writable physical block of said last physical unit, said writable physical block having the same block offset as said physical block of said written physical unit; and (o) updating said virtual map by mapping said virtual unit to said last physical unit, such that said virtual unit corresponds only to said last physical unit.

6. The method of claim 5, further comprising the step of:

(p) erasing all of said written physical units in said chain, with the exception of said last physical unit.

7. The method of claim 3, further comprising the steps of:

(l) if no unwritten physical unit is available for allocation for said chain, allocating an unwritten physical unit for reorganization;

(m) moving data from each of said physical blocks of said written physical unit to a writable physical block of said unwritten physical unit; and (n) updating said virtual map by mapping said virtual unit to said unwritten physical unit, such that said virtual unit corresponds only to said unwritten physical unit.

8. The method of claim 7, further comprising the step of:

(o) erasing all of said written physical units.

9. A memory organization method for a memory in which data can only be written to an unwritten portion of the memory, such that a written portion of the memory must be erased to become unwritten, and in which the size of the memory portion for reading or writing data differs from the size of the smallest memory portion for erasing, the method comprising the steps of:

(a) providing a plurality of physical units of the memory each of said physical units being the smallest memory portion for erasing, each of said physical units being designated by a physical unit number and each of said physical units being divided into a plurality of physical blocks, each of said plurality of physical blocks being the memory portion for reading or writing data and each of said physical blocks being designated by a physical block offset within said physical unit;

(b) providing a plurality of virtual units of the memory, each virtual unit being designated by a virtual unit number and each of said virtual units featuring a plurality of virtual blocks, each of said virtual blocks being designated by a virtual block offset within said virtual unit;

(c) providing a virtual map for mapping each virtual unit to at least one physical unit;

(d) mapping each virtual block within said virtual unit to one physical block within said at least one physical unit;

(e) receiving a write command to write data at a virtual block;

(f) locating a virtual unit containing said virtual block;

(g) locating a writable block within a physical unit mapped to said virtual unit;

(h) writing said data to said writable physical block;

(i) if an unwritten physical block in a written physical unit cannot be located, allocating an unwritten physical unit to form a chain of physical units, such that said unwritten physical unit is a last physical unit in said chain;

(j) writing said data to an unwritten physical block in said last physical unit;

(k) moving data from each of said plurality of physical blocks to a writable physical block of said last physical unit, except data written in step (j); and (l) updating said virtual map by mapping said virtual unit to said written physical unit, such that said virtual unit corresponds to said written physical unit.

10. The method of claim 1, further comprising the step of:

(e) altering said virtual map to reflect a change in the memory by changing a correspondence between at least one of said plurality of virtual units of the memory and at least one of said plurality of physical units of the memory.

11. The method of claim 3, wherein said writable physical block of said second physical unit has a physical block offset, and said physical block offset is different than said virtual block offset of said mapped virtual unit.

12. A method of writing data for a memory in which data can only be written to an unwritten portion of the memory, such that a written portion of the memory must be erased to become unwritten, the method comprising the steps of:

(a) providing a plurality of physical units being divided into a plurality of physical blocks, each of said physical units having a physical unit number and each of said physical blocks having a physical block offset within said physical unit;

(b) providing a plurality of virtual units being divided into a plurality of virtual blocks, each of said virtual units having a virtual unit number and each of said virtual blocks having a virtual block offset within said virtual unit, each virtual unit being mapped to at least one physical unit;

(c) receiving a write command to write data at a virtual block;

(d) determining a virtual unit containing said virtual block having a virtual block offset;

(e) locating a physical unit corresponding to said virtual unit;

(f) locating a physical block within said physical unit;

(g) determining if said physical block is unwritten;

(h) writing said data to said physical block only if said physical block is unwritten;

(i) alternatively, if said physical block is not unwritten, allocating second physical unit;

(j) locating a writable physical block within said second physical unit, said writable physical block having a physical block offset;

(k) writing said data to said writable physical block;

(l) additionally mapping said virtual unit to said second physical unit containing said writable physical block, such that said virtual unit is additionally mapped to said second physical unit to form a chain of physical units;

(m) if an unwritten physical block in a written physical unit cannot be located, locating a second virtual unit corresponding to a plurality of physical units in a chain;

(n) locating a last physical unit in said chain;

(o) transferring all data within said physical blocks of said written physical unit to said physical blocks of said last physical unit; and (p) updating said virtual map such that said virtual unit corresponds only to said last physical unit.

13. The method of claim 12, wherein said physical block offset of said writable physical block has an identical block offset number as said virtual block offset.

14. The method of claim 12, further comprising the step of:

(q) erasing all of said written physical units.

15. A method of writing data for a memory in which data can only be written to an unwritten portion of the memory, such that a written portion of the memory must be erased to become unwritten, the method comprising the steps of:

(a) providing a plurality of physical units being divided into a plurality of physical blocks, each of said physical units having a physical unit number and each of said physical blocks having a physical block offset within said physical unit;

(b) providing a plurality of virtual units being divided into a plurality of virtual blocks, each of said virtual units having a virtual unit number and each of said virtual blocks having a virtual block offset within said virtual unit, each virtual unit being mapped to at least one physical unit;

(c) receiving a write command to write data at a virtual block;

(d) determining a virtual unit containing said virtual block having a virtual block offset;

(e) locating a physical unit corresponding to said virtual unit;

(f) locating a physical block within said physical unit;

(g) determining if said physical block is unwritten;

(h) writing said data to said physical block only if said physical block is unwritten;

(i) alternatively, if said physical block is not unwritten, allocating a second physical unit;

(j) locating a writable physical block within said second physical unit, said writable physical block having a physical block offset;

(k) writing said data to said writable physical block; and (l) additionally mapping said virtual unit to said second physical unit containing said writable physical block, such that said virtual unit is additionally mapped to said second physical unit to form a chain of physical units;

(m) if no unwritten physical unit is available for allocation, locating a last physical unit in said chain;

(n) transferring all data within said physical blocks of said written physical units to said physical blocks of said last physical unit; and (o) updating said virtual map such that said virtual unit corresponds only to said last physical unit.

16. The method of claim 15, further comprising the step of:

(p) erasing all of said written physical units, with the exception of said last physical unit.

17. A memory organization method for a memory in which data can only be written to an unwritten portion of the memory, such that a written portion of the memory must be erased to become unwritten, and in which the size of the memory portion for reading or writing data differs from the size of the smallest memory portion for erasing, the method comprising the steps of:

(a) providing a plurality of physical units of the memory, each of said physical units being the size of the smallest memory portion for erasing, each of said physical units being designated by a physical unit number and each of said physical units being divided into a plurality of physical blocks, each of said plurality of physical blocks being the size of the memory portion for reading or writing data and each of said physical blocks being designated by a physical block offset within said physical unit;

(b) providing a plurality of virtual units of the memory, each virtual unit being designated by a virtual unit number and each of said virtual units featuring a plurality of virtual blocks, each of said virtual blocks being designated by a virtual block offset within said virtual unit;

(c) providing a virtual map for mapping each virtual unit to at least one physical unit;

(d) mapping each virtual block within said virtual unit to one physical block within said at least one physical unit;

(e) receiving a write command to write data at a virtual block;

(f) locating a virtual unit containing said virtual block;

(g) locating a writable block within a physical unit mapped to said virtual unit;

(h) writing said data to said writable physical block to form a written physical unit;

(i) if an unwritten physical block in said written physical unit cannot be located, locating a second physical unit with a writable physical block;

(j) writing said data to said writable physical block of said second physical unit;

(k) updating said virtual map by additionally mapping said virtual unit to said second physical unit, such that said virtual unit corresponds to said second physical unit and to said written physical unit, said second physical unit and said written physical unit forming a chain of physical units;

(l) if an unwritten physical block in any physical unit cannot be located, locating a second virtual unit corresponding to a plurality of physical units in a chain;

(m) locating a last physical unit in said chain;

(n) moving data from each of said physical blocks of said written physical unit to a writable physical block of said last physical unit, said writable physical block having substantially the same block offset as said physical block of said written physical unit; and (o) updating said virtual map by mapping said virtual unit to said last physical unit, such that said virtual unit corresponds only to said last physical unit.

* * * * *

UNITED STATES PATENT AND TRADEMARK OFFICE
CERTIFICATE OF CORRECTION

PATENT NO.   : 5,937,425
DATED        : August 10, 1999
INVENTOR(S)  : Amir Ban et al.

It is certified that error appears in the above-identified patent and that said Letters Patent is hereby corrected as shown below:

Inventor: please add Eugene Zilberman, Richmond Hill, Ont., Canada

Signed and Sealed this

Eighteenth Day of September, 2001

*Attest:*

NICHOLAS P. GODICI
*Attesting Officer*  *Acting Director of the United States Patent and Trademark Office*